(12) United States Patent
Bauer

(10) Patent No.: US 10,868,745 B2
(45) Date of Patent: Dec. 15, 2020

(54) DEVICE AND NETWORK TO RELIABLY COMMUNICATE IN A NETWORK

(71) Applicant: TTTech Computertechnik AG, Vienna (AT)

(72) Inventor: Günther Bauer, Vienna (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 24 days.

(21) Appl. No.: 16/399,087

(22) Filed: Apr. 30, 2019

(65) Prior Publication Data

US 2019/0342196 A1 Nov. 7, 2019

(30) Foreign Application Priority Data

May 2, 2018 (EP) ..................................... 18170412

(51) Int. Cl.
*H04L 12/26* (2006.01)

(52) U.S. Cl.
CPC .......... *H04L 43/0817* (2013.01); *H04L 43/50* (2013.01)

(58) Field of Classification Search
CPC .................................................. H04L 43/0817
See application file for complete search history.

(56) References Cited

U.S. PATENT DOCUMENTS

| 4,070,648 | A | * | 1/1978 | Mergenthaler | ............ | H04L 1/14 |
| | | | | | | 714/18 |
| 5,533,034 | A | * | 7/1996 | Kuwata | ................. | H04L 1/1692 |
| | | | | | | 714/747 |
| 5,854,994 | A | * | 12/1998 | Canada | .................. | G01H 1/003 |
| | | | | | | 702/56 |
| 6,151,689 | A | * | 11/2000 | Garcia | ................ | G06F 11/1482 |
| | | | | | | 714/18 |
| 10,241,858 | B2 | * | 3/2019 | Kopetz | ............... | G06F 11/0796 |
| 10,324,797 | B2 | * | 6/2019 | Kopetz | ................. | G06F 11/073 |
| 10,346,242 | B2 | * | 7/2019 | Poledna | ............. | G06F 11/0796 |
| 10,397,081 | B2 | * | 8/2019 | Poledna | ............. | G06F 11/1641 |

(Continued)

FOREIGN PATENT DOCUMENTS

| EP | 2139172 A1 | 12/2009 |
| EP | 3166246 A1 | 5/2017 |

OTHER PUBLICATIONS

European Search Report, for EP Application No. 18170412.3, dated Oct. 11, 2018 (6 pages).

*Primary Examiner* — Parth Patel
(74) *Attorney, Agent, or Firm* — Eversheds Sutherland (US) LLP

(57) ABSTRACT

A self-checking network device (201) for communication in a real-time network, wherein the self-checking network device (201) includes at least four modules (S-COM, P-COM, P-MON, S-MON), wherein the network device (201) and/or each of the four modules is configured such that a first module (S-COM) of the at least four modules receives both regular data and protocol data from said communication links (110) on a first input (COM-IN), and said first module (S-COM) forwards protocol data on a second input (P-COM-IN) to a second module (P-COM) of the at least four modules, wherein said second module (P-COM) executes a first function (C-PU) as part of the one or the more of the network protocols using protocol data received on said second input (P-COM-IN) and produces protocol data as output on a first output (P-COM-OUT).

9 Claims, 7 Drawing Sheets

(56) References Cited

U.S. PATENT DOCUMENTS

| | | | | |
|---|---|---|---|---|
| 10,488,864 | B2* | 11/2019 | Kopetz | G05D 1/0088 |
| 10,520,337 | B2* | 12/2019 | Hammerschmidt | G01P 21/02 |
| 2003/0093748 | A1* | 5/2003 | Kim | H04L 1/0068 |
| | | | | 714/776 |
| 2003/0126238 | A1* | 7/2003 | Kohno | H04N 21/4621 |
| | | | | 709/220 |
| 2006/0187026 | A1* | 8/2006 | Kochis | G08B 13/24 |
| | | | | 340/539.13 |
| 2007/0147381 | A1* | 6/2007 | Wilhelm | H04L 47/11 |
| | | | | 370/392 |
| 2008/0010435 | A1* | 1/2008 | Smith | G06F 11/26 |
| | | | | 712/10 |
| 2008/0195912 | A1* | 8/2008 | Mende | H04L 1/1809 |
| | | | | 714/752 |
| 2009/0327826 | A1* | 12/2009 | Inoue | H04L 1/1809 |
| | | | | 714/748 |
| 2011/0047431 | A1* | 2/2011 | Owaki | H04L 1/008 |
| | | | | 714/748 |
| 2015/0347218 | A1* | 12/2015 | Domingues | G06F 11/0772 |
| | | | | 714/57 |
| 2017/0132065 | A1* | 5/2017 | Schwarz | G06F 11/1625 |
| 2019/0342196 | A1* | 11/2019 | Bauer | H04L 1/24 |

* cited by examiner

DEVICE AND NETWORK TO RELIABLY COMMUNICATE IN A NETWORK

CROSS-REFERENCE TO RELATED APPLICATIONS

This application claims priority to European Patent Application No. 18170412.3, filed May 2, 2018, which is incorporated herein by reference.

TECHNICAL FIELD

The invention relates to a self-checking network device for communication in a real-time network, wherein the self-checking network device is connected to two or more communication links, and the self-checking network device exchanges regular data and protocol data with other network devices and/or nodes of the real-time network using the two or more communication links, and the protocol data is communicated as part of one or more certain network protocols.

Furthermore, the invention relates to a real-time network, in particular a real-time computer network, comprising at least one self-checking network device and one, two, or a multitude of nodes connected to said self-checking network device.

BACKGROUND

Distributed computer systems are used in safety-critical and/or safety-related applications. Example areas of such distributed computer systems are automotive in-vehicle distributed computer systems, avionics, industrial automation, in-vehicle distributed computer systems of duty vehicles, distributed computer systems for use in energy generation plants, industrial robotics, and many more. Such distributed computer systems must provide fault-tolerance capabilities, which means that they need to bring the application into a safe state in the case of failure (i.e., fail-safe systems). Furthermore, some distributed computer systems may even need to continue operation in case of failure (i.e., fail-operational systems). Some examples of fail-safe systems are industrial automation systems, while examples of fail-operational systems are autonomously driving vehicles (e.g., cars, duty vehicles, drones, unmanned-aeronautical vehicles, airplanes, etc.). Often such distributed computer systems execute control algorithms that control the behavior of a physical system (like the movement of the car, airplane, duty vehicle, industrial robot, or the operation of the industrial automation system). Therefore, the distributed computer system must also provide real-time guarantees for computations as well as real-time guarantees for the communication between different subsystems of the distributed computer system. Distributed computer systems often realize network protocols to coordinate the activities of (some) of the subsystems of the distributed computer system, for example to satisfy the real-time communication requirements of the distributed computer system.

A means to achieve fault-tolerance capabilities is the design of one, two, or a multitude of subsystems each as a self-checking pair. Such a self-checking pair can be constructed by two parts, a commander part COM and a monitor part MON, where the monitor MON monitors the inputs and outputs of the commander COM and has an ability to execute one, two, or a multitude of safe actions. Such a safe action may be the shutdown of the commander COM or the shutdown of the overall self-checking pair, the selective disablement of certain elements of the self-checking pair, the invalidation of some or all of the data produced by the commander COM, or similar actions.

It would be desirable to provide a new and improved design of a self-checking pair for network devices, such as switches/routers/gateways/starcouplers, and network devices alike.

SUMMARY

A self-checking network device is provided, wherein according to the invention the self-checking network device comprises at least four modules, wherein the network device and/or each of the four modules is configured in a way that a first module of the at least four modules receives both regular data and protocol data from said communication links on a first input—COM-IN—, and said first module forwards protocol data on a second input—P-COM-IN—to a second module of the at least four modules, wherein said second module executes a first function as part of the one or the more certain network protocols, using protocol data received on said second input—P-COM-IN—and produces protocol data as output on a first output—P-COM-OUT—, and a third module of the at least four modules monitors said second input—P-COM-IN—and said first output—P-COM-OUT—of said second module, and wherein said third module executes protocol checks on said second input—P-COM-IN—and said first output—P-COM-OUT—and executes a safe action in case that said protocol checks indicate that said second module does not confirm to rules of said one or more certain network protocols, and in the case that said third module does not execute a safe action, protocol data produced by said second module on said first output—P-COM-OUT—is provided on a third input—P-COM-MON-OUT—to said first module, and said first module executes regular operations on regular data and on protocol data received from said third input—P-COM-MON-OUT—, and a fourth module of the at least four modules monitors the first input—COM-IN—, the second input—P-COM-IN—, the third input—P-COM-MON-OUT—and the second output—COM-OUT—of said first module, and wherein said fourth module executes regular data checks on said first input—COM-IN—, on said second input—P-COM-IN—, on said third input—P-COM-MON-OUT—and on said second output—COM-OUT—and executes a safe action in case that said regular data checks indicate a failure of the said first module, and wherein in the case that said fourth module does not execute a safe action, the self-checking network device provides protocol data and/or regular data received on said second output—COM-OUT—to the one or more communication links.

Furthermore, the object is achieved with a network mentioned above, where said network comprises one, two or more of said self-checking network devices is/are network devices according to the invention.

A key design aspect is in the reduction of implementation complexity and therefore also cost reduction by separating state-of-the-art monolithic parts of self-checking pairs into modules. In particular, we disclose how to construct the commander part COM and the monitor part MON as modularized parts with at least two modules each: one module that handles regular dataflow and a second module that handles traffic specific to certain network protocols. This modularization simplifies the monitoring activity of the monitor MON and/or the coordination between the commander COM and the monitor MON.

Advantageous embodiments of the network device and of the real-time network described above are detailed hereinafter:

The number of second inputs—P-COM-IN—may be smaller than the number of first inputs—COM-IN—, and/or the number of first outputs—P-COM-OUT—may be smaller than the number of second outputs—COM-OUT.

Said fourth module may coordinate its monitoring activity with said first module.

Said third module may coordinate its monitoring activity with said second module.

The self-checking network device may be realized by at least two encapsulated devices, wherein said encapsulated devices are connected to each other by means of one, two, or more encapsulation links and wherein a first encapsulation device implements said second module and said third module and a second encapsulation device implements said first module and said fourth module.

Said first function may be a compression master function and/or a synchronization master function and/or a synchronization client function as standardized in SAE AS6802 or any following standard.

Said first function may be a grandmaster functionality according to one of the standards: IEEE 802.1AS, IEEE 1588, or any following standards to these standards.

Said first function may be a network address learning function or a network address providing function.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION

Some of the many implementations of the invention are described below. If not stated otherwise, all details described in connection with a specific example are not only valid in connection with this example, but apply to the general scope of protection of the invention.

Figure 1:
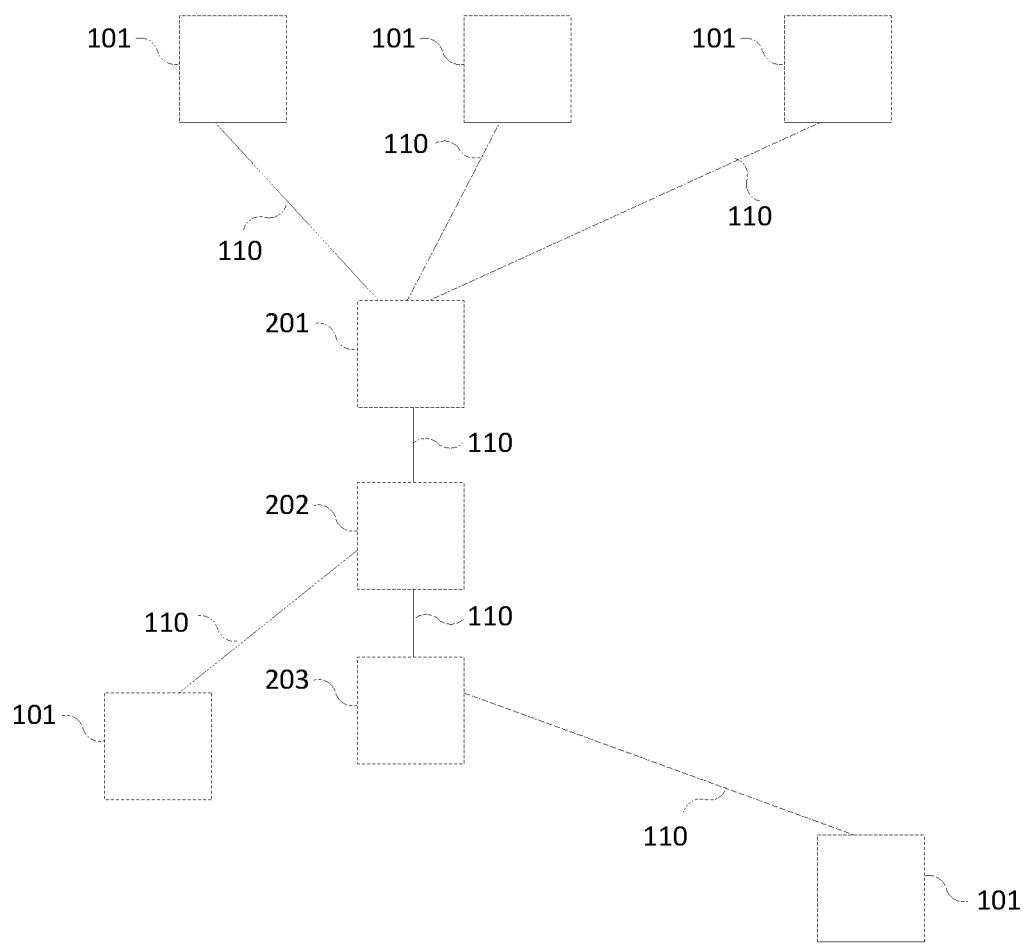
FIG. 1 an example of a real-time network.

FIG. 1 depicts an example of a real-time network. As depicted nodes 101 are connected to network devices 201, 202, 203 with communication links 110. Network devices 201, 202, 203 may be connected to each other as well. Network devices 201, 202, 203 may be switches, routers, gateways, starcouplers or alike. Nodes 101 may be sensors, actuators, and/or may comprise functionality to execute application code, as for example a control program. Preferably the communication links 110 are full-duplex, which means they allow communication in both directions at the same time. In one realization the communication links 110 may be Ethernet links. In another realization the communication links 110 may connect one, two, or many SERDES (serializer de-serializer) interfaces of the nodes 101 and network devices 201, 202, 203, for example to realize PCIe connections.

Figure 2:
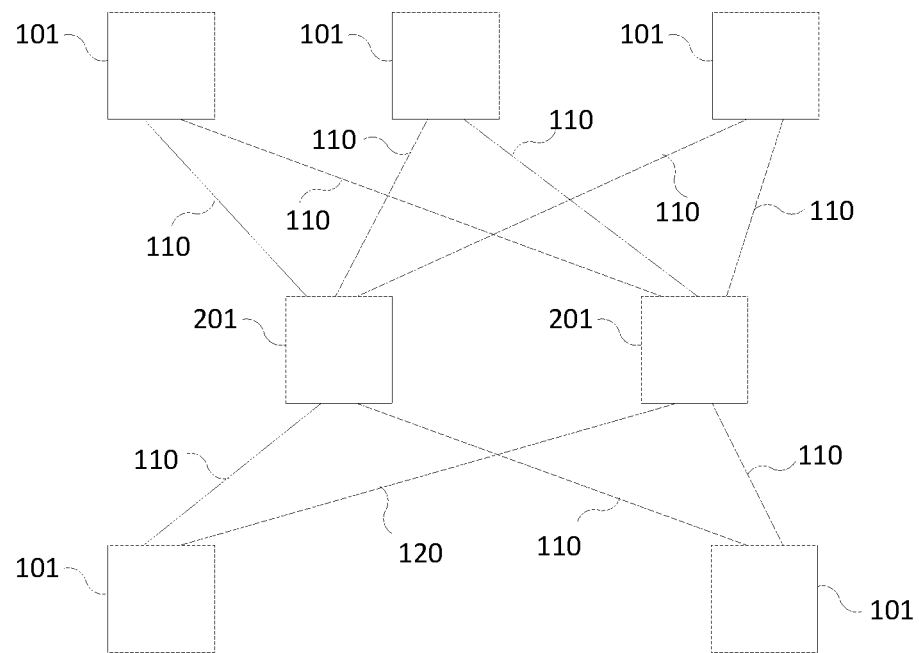
FIG. 2 an example of a real-time network.

FIG. 2 depicts another example of a real-time network. In this real-time network nodes 101 connect to multiple network devices 201 via communication links 110, for example full-duplex links. Thus, in the case of the failure of one of the network devices 201 or one of the communication links 110 each node 101 can still communicate with each other node 101 by means of the non-faulty network devices 201 and non-faulty communication links 110.

Figure 3:
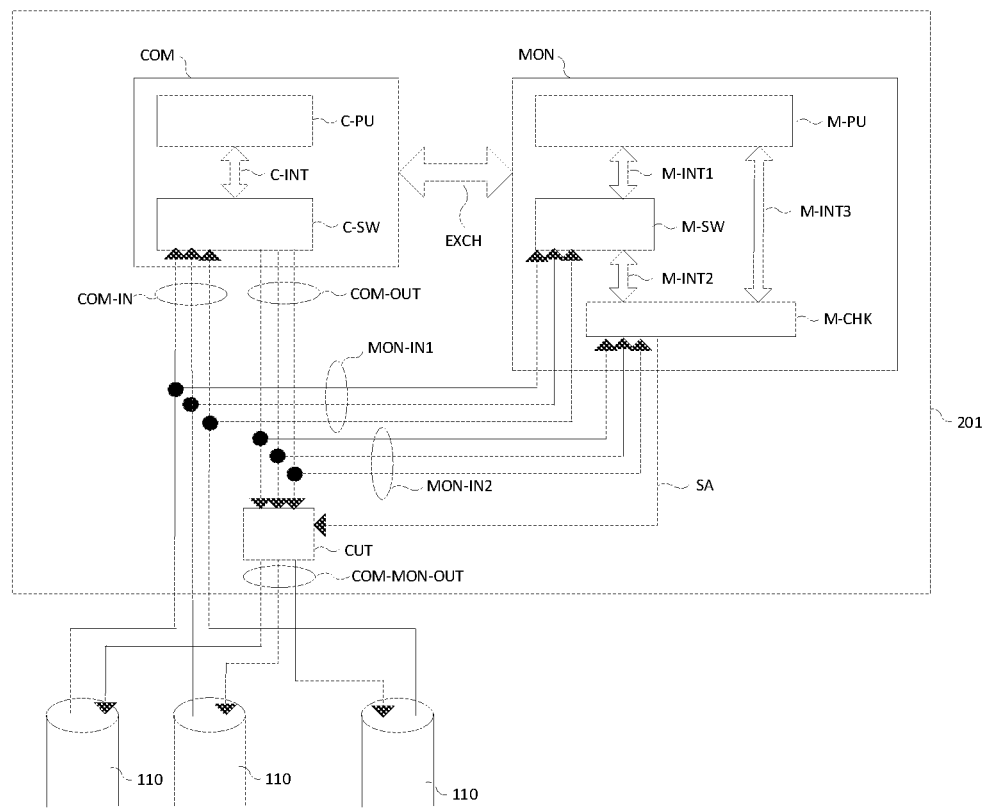
FIG. 3 an example of a network device designed as self-checking pair with monolithic parts, FIG. 4 an example of a network device designed as self-checking pair with modularized parts, FIG. 4a an example of a network device designed as self-checking pair with modularized parts, FIG. 5 an example of a network device and an external node, both designed as self-checking pairs with modularized parts, FIG. 6 an example of a network device and an external node, both designed as self-checking pairs with modularized parts, and FIG. 7 an example of a network device and an external node, both designed as self-checking pairs with modularized parts.

FIG. 3 depicts an example of a network device 201 designed as self-checking pair with monolithic parts. In particular, the network device 201 presented implements a monolithic commander part COM and a monolithic monitor part MON. In this example and for illustration purposes only, the network device 201 is connected to three communication links 110. In another realization, the number of communication links 110 that a network device may connect to is two or higher than two.

The full-duplex characteristic of the communication links 110 is depicted by two arrows connecting the communication link 110 to the network device. The arrow pointing from the communication link 110 to the network device 201 represents reception of data from a communication link 110 in the network device 201, while the arrow pointing from the network device to the communication link 110 represents the transmission of data from the network device 201 to the communication link 110.

As depicted the network device 201 receives data from a communication link 110. The communication within the network device 201 and the communication of the network device 201 with the communication links is represented via connections that may act as inputs, as outputs, or both (e.g., the output of one part may be the input to another part). Both, the commander part COM (via the input COM-IN) as well as the monitor part MON (via the input MON-IN1) receive some or all of said data. Branches from the reception/transmission lines are symbolically depicted by black dots in the figures). A subset of said data received may belong to certain network protocols that both the commander part COM and the monitor part MON process by means of protocol units C-PU and M-PU. We call this data belonging to certain network protocols the "protocol data". Examples of such certain network protocols are clock synchronization protocols, security protocols, real-time protocols. In one realization the protocol units may implement the Synchronization Master functionality and/or the Compression Master functionality of the SAE AS6802 standard. The functionality executed by the protocol unit is of the nature that the protocol data that the protocol units C-PU and M-PU receive is different from the protocol data that the protocol units C-PU and M-PU generate. For example, in the case of the SAE AS6802 Compression Master, the C-PU and M-PU would receive so called Protocol Control Frames (PCFs) from the communication links and generate new Compressed Protocol Control Frames (compressed PCFs). Protocol data that belongs to said certain network protocols is provided to the protocol units C-PU and M-PU by means of interfaces C-INT and M-INT1, respectively.

Data that does not belong to said certain network protocols is not processed by the protocol units C-PU and M-PU and is not provided to the protocol units C-PU and M-PU by means of the respective interfaces C-INT and M-INT1. We call such data that does not belong to said certain network protocols "regular data". For clarity we note that regular data may also include data from network protocols other than the said certain network protocols that are executed in the protocol units C-PU and M-PU.

The commander part COM of the network device 201 executes one, two, or multiple of regular operations C-SW on regular data, examples of such regular operations are:

- The COM forwards incoming data from a communication link 110 towards one, two, or a multitude of communication links 110.
- The COM changes header information in the incoming data from a communication link 110 (e.g., VLAN tagging or retagging in case of IEEE 802.1Q data).
- The COM filters and or discards some incoming data from a communication link 110 (e.g., IEEE 802.1Qci mechanism, execution of Access Control Lists—ACLs, execution of firewall rules, etc.).
- The COM forwards incoming data from a communication link 110 only after a temporal delay (e.g., using the credit-based shaper function as standardized in IEEE 802.1Qav).
- The COM forwards incoming data from a communication link 110, to one, two, or a multitude of communication links 110 at a configured point in a synchronized time base in which two or more network devices 201 and/or nodes 101 are synchronized to each other (e.g., scheduled transmissions as standardized in IEEE 802.1Qbv or time-triggered communication, like TTEthernet).

In one realization of the invention a synchronized timebase used for regular data transmission is established by means of a clock synchronization protocol that belongs to the set of said certain network protocols. In one realization the certain network protocol used is the SAE AS6802 clock synchronization protocol. In another realization the certain network protocol is the IEEE 802.1AS protocol. In another realization the certain network protocol is the IEEE 1588 protocol.

The monitor part MON of the network device 201 listens to some or all of the data that the commander part COM receives (via the input MON-IN1) as well as to all or some of the data that the commander part COM transmits (via input MON-IN2). As depicted output COM-OUT acts as the input MON-IN2. The monitor part MON, furthermore, executes one or many checks M-CHK that aim to identify whether the output COM-OUT generated by the commander part COM is a correct response to the input COM-IN of the commander part COM. If said one or many checks M-CHK indicate that the COM-OUT is not a correct response to the input COM-IN, then the monitor part MON may execute a safe action SA. In FIG. 3 the safe action SA is represented by an output interception mechanism CUT that transforms data communicated on the output COM-OUT of the commander part COM to different data communicated on output COM-MON-OUT. This different data on output COM-MON-OUT may be of the nature that any receiver of data on said output can identify the data on the output as incorrect. Other safe actions have already been mentioned earlier, but are not depicted here and may be executed in addition or as an alternative to the safe action SA depicted in FIG. 3.

For the sake of precise monitoring, the monitor part MON and the commander part COM may need to exchange information via an interface EXCH. This information may be for example information regarding the validity, correctness, contents, and/or timing of the received regular data and/or the received protocol data.

FIG. 3 also shows an example of an inner structure of the monitor part MON. In particular in one realization the monitor part MON would receive the input COM-IN as input MON-IN1 in a unit M-SW that executes the same or similar regular operations C-SW as the commander part COM. This unit M-SW provides the results of said same or similar regular operations via an interface M-INT2 as input for the check(s) M-CHK. Furthermore, certain protocol data may be provided to the protocol unit M-PU of the monitor part MON. The protocol unit M-PU may as well provide input for said check(s) via an interface M-INT3.

According to the state of the art the commander part COM and the monitor part MON are monolithic parts. That means that the check or checks M-CHK executed by the monitor part MON address both, regular data and protocol data. This monolithic design has two major drawbacks:

- the check or checks M-CHK need to be executed for each communication link 110 that the network device 201 connects to and
- the exchange of information EXCH between the commander part COM and the monitor part MON needs to be done for each communication link 110.

Figure 4:
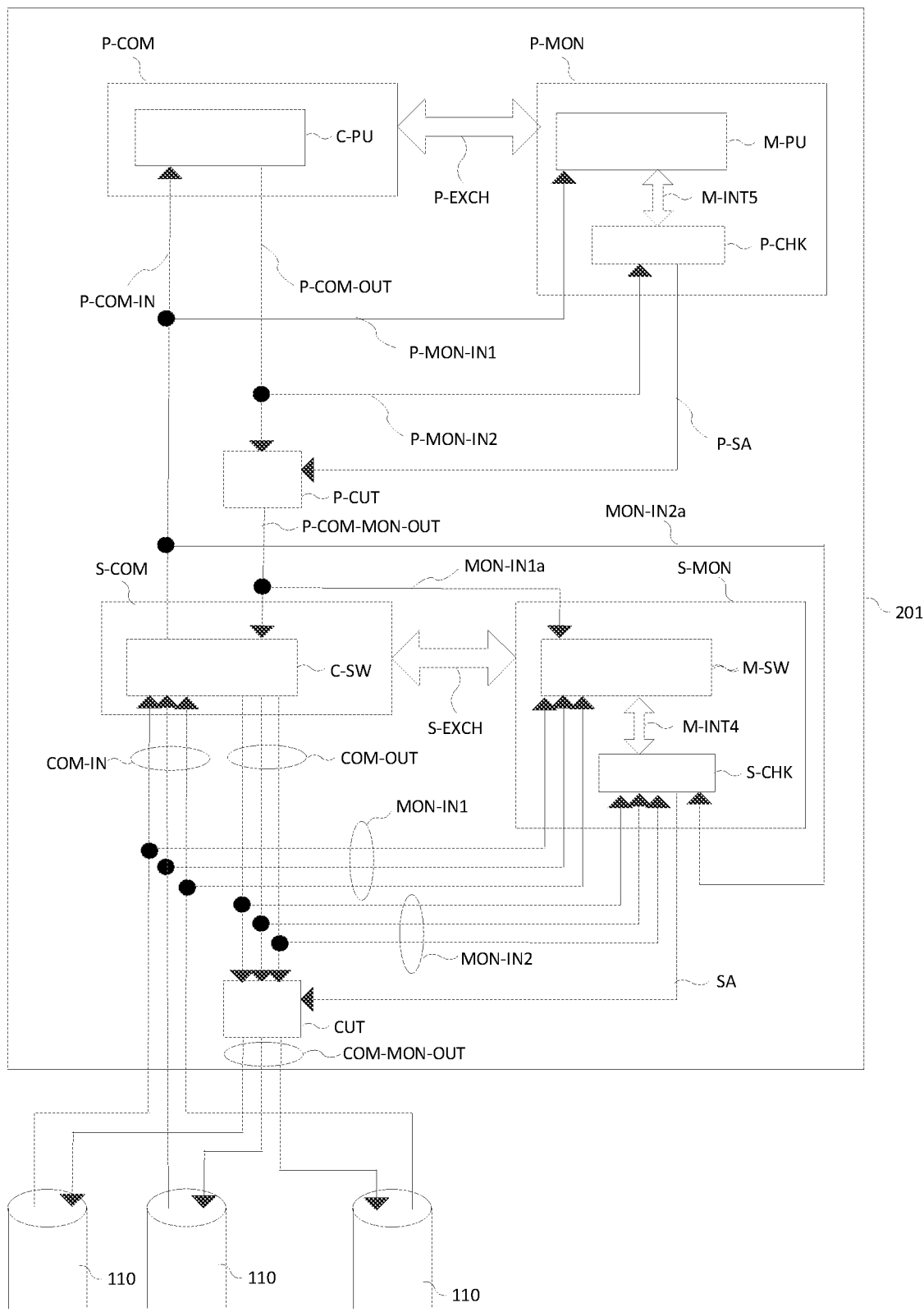

FIG. 4 depicts an example realization of a network device 201 that removes said drawbacks by a modularized design of a commander part COM into at least two modules S-COM and P-COM and a monitor part MON into at least two modules S-MON and P-MON such that the check or checks M-CHK are separated in a check or set of checks P-CHK that the monitor part MON executes for protocol data in the P-MON module and a check or set of checks S-CHK that the monitor part MON executes for regular data in the S-MON module. As a consequence of this modularization, the check or set of checks P-CHK does/do not need to be executed for each communication link 110 that the network device connects 201 to, but need to be executed less than the number of communication links 110 that the network device connects to. In some realization the check or set of checks P-CHK does/do need to be executed only for one set of input P-COM-IN and output P-COM-OUT. The check or set of checks S-CHK for regular data may still be executed for each communication link 110. Furthermore, in the S-MON module the same check or set of checks S-CHK executed for regular data may also be executed for protocol data. Again, the communication between modules of the network device 201 is represented via connections that may act as inputs, as outputs, or both (e.g., the output of one module may be the input to another module).

Checks on protocol data P-CHK may be for example: the P-MON may check that the P-COM only generates protocol data on its output P-COM-OUT that corresponds to the rules of said certain network protocols. This check or set of checks P-CHK may allow for certain inaccuracies that result from physical effects such as the imperfection of synchronization of the P-COM to the P-MON.

Rules may be deduced from the specifications and/or standards of said certain network protocols and/or from manual review of concrete implementations of said certain network protocols.

An example of said rules is for example the compression master algorithm as defined in the SAE AS6802 standard that defines how a compressed PCF is generated from one or many input PCFs. In this example, the P-COM would calculate the compressed PCF and provide this compressed PCF on its output P-COM-OUT and the P-MON module would check whether the compressed PCF as produced from the P-COM module satisfies the rules derived from the compression master algorithm of the SAE AS6802 standard. In another example the check P-CHK for rules and algorithms of certain network protocols may include the check that certain specific protocol data is produced, e.g., specific protocol message with specific types and contents. In the case of the SAE AS6802 protocol for example, the P-CHK may include checks that the P-COM only produces Coldstart Frames and/or Coldstart Acknowledge Frames and/or Integration frames at particular points in time with particular content. Similar protocol checks P-CHK are possible for other synchronization protocols, security protocols, and/or real-time protocols. For example in the case of IEEE 1588 or IEEE 802.1AS a protocol check P-CHK could check that announce or synchronization messages and/or delay messages and/or delay response messages may only be sent at particular points in time with particular content.

The execution of such protocol checks P-CHK in the P-MON module typically requires the P-MON to execute the certain network protocol(s) (or in some cases simplified versions of it/them) in coordination with the C-MON module and is therefore (because of the duplicated execution and the need for coordination P-EXCH) costly and complex to implement. Protocol execution is indicated by C-PU and M-PU in the P-COM and P-MON modules respectively. The protocol execution M-PU in the P-MON module provides information for the protocol check(s) P-CHK by means of an interface M-INT5.

Regular data checks S-CHK may be for example:

The S-MON may check that the S-COM forwards data only to permitted communication links 110.

The S-MON may check that S-COM only sends data to communication links 110 that has previously been received (i.e., the S-MON checks that the S-COM does not generate new incorrect data).

The S-MON may check whether the S-COM correctly changes header information in the incoming data from a communication link 110 (e.g., VLAN tagging or retagging in case of IEEE 802.1Q data).

The S-MON may check whether the S-COM filters and or discards some incoming data from a communication link 110 (e.g., IEEE 802.1Qci mechanism, execution of Access Control Lists—ACLs, execution of firewall rules, etc.).

The S-MON may check whether the S-COM forwards incoming data from a communication link 110 only after a temporal delay (e.g., using the credit-based shaper function as standardized in IEEE 802.1Qav).

The S-MON may check whether the S-COM forwards incoming data from a communication link 110, to one, two, or a multitude of communication links 110 at a configured point in a synchronized time base in which two or more network devices 201 and/or nodes 101 are synchronized to each other (e.g., scheduled transmissions as standardized in IEEE 802.1Qbv or time-triggered communication, like TTEthernet).

FIG. 4 further depicts a separation of the information exchange EXCH between the commander part COM and the monitor part MON in a first information exchange P-EXCH between the P-COM module and the P-MON module and a second information exchange S-EXCH between the S-COM module and the S-MON module. Again, since the protocol checks P-CHK need to be executed only for less than the number of communication links 110 the network device 201 connects to the information exchange P-EXCH is simplified as well. Also, since the information exchange S-EXCH does not need to exchange information regarding protocol data (except the same information as is exchanged for regular data), S-EXCH is simplified as well. In some realization the S-EXCH does not need to be implemented at all.

FIG. 4 further depicts that because of the modularization the internal interface C-INT in the monolithic design of the commander part COM (FIG. 3) is replaced by an interface between the S-COM and P-COM modules. In one realization this interface between the modules S-COM and P-COM consists of a connection P-COM-IN on which the S-COM module sends protocol data to the P-COM module, a connection P-COM-OUT on which the P-COM module provides protocol data, a safe action P-SA that allows the P-MON module to interfere with the output P-COM-OUT, and the input P-COM-MON-OUT to the S-COM module that is the result of the safe action applied to the output P-COM-OUT, by the P-MON module, e.g., by means of a interception mechanism P-CUT.

The P-MON module applies the safe action P-SA when the protocol check or set of checks P-CHK indicates a faulty behavior of the P-COM module. For this purpose the P-MON module receives part of or all protocol data that the P-COM module receives (by monitoring the input P-MON-IN1) and that the P-COM module produces (by monitoring the input P-MON-IN2 that branches from the output P-COM-OUT).

The S-MON module does not execute protocol checks, but only executes checks S-CHK on regular data and may also execute the same regular data checks on the protocol data as well. One realization of this application of the same regular data checks S-CHK on protocol data is depicted in FIG. 4 which indicates these same checks as for regular data also on the protocol data by additional inputs to S-MON: MON-IN2*a* and MON-IN1*a*. Input MON-IN2*a* branches from P-COM-IN, which is an input to P-COM as well as an output from S-COM. Input MON-IN1*a* branches from P-COM-MON-OUT which is an input to S-COM and originates as output from P-COM subject to modification by P-CUT.

For example, when protocol data that the S-COM receives via the input P-COM-MON-OUT is also monitored by the S-MON via the input MON-IN1*a*, the S-MON can implement regular data checks S-CHK on this protocol data by monitoring the output behavior of the S-COM on the output COM-OUT. In particular, if the S-COM, in the case of a failure, sends out protocol data on an output COM-OUT that it did not receive prior from the input P-COM-MON-OUT, the S-CHK in the S-MON would detect this faulty behavior by the previously mentioned regular data check:

The S-MON may check that S-COM only sends data to communication links 110 that has previously been received (i.e., the S-MON checks that the S-COM does not generate new incorrect data).

Figure 4A:
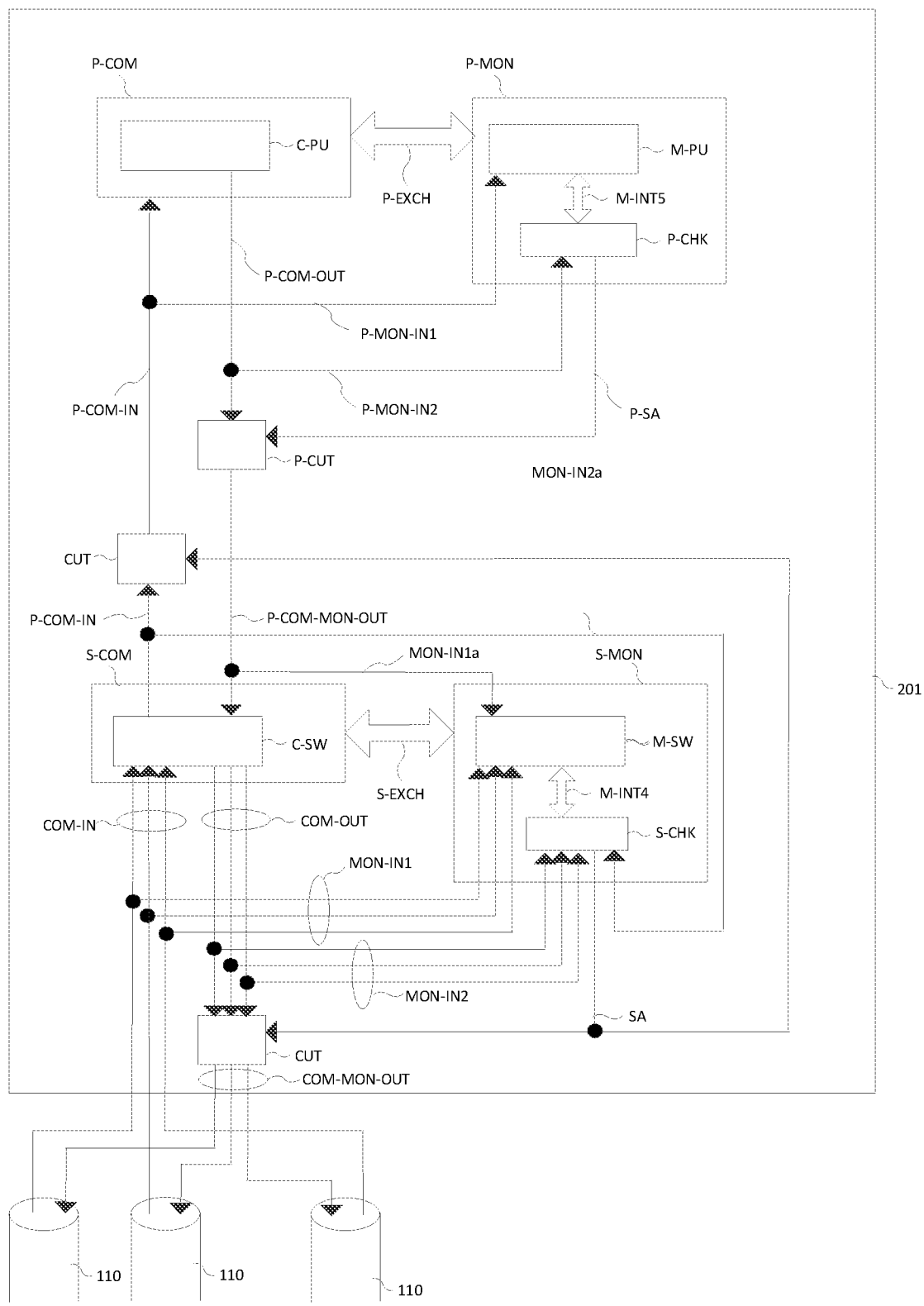

FIG. 4*a* depicts another realization of the invention that slightly extends the realization as discussed in FIG. 4. In particular, the realization in FIG. 4*a* also implements an output interception mechanism CUT on P-COM-IN. P-COM-IN is an output from S-COM acting as input to P-COM. In case the regular data checks S-CHK indicate a failure P-COM-IN, the S-MON may initiate a safe action SA that activates the interception mechanism CUT on P-COM-IN.

Figure 5:
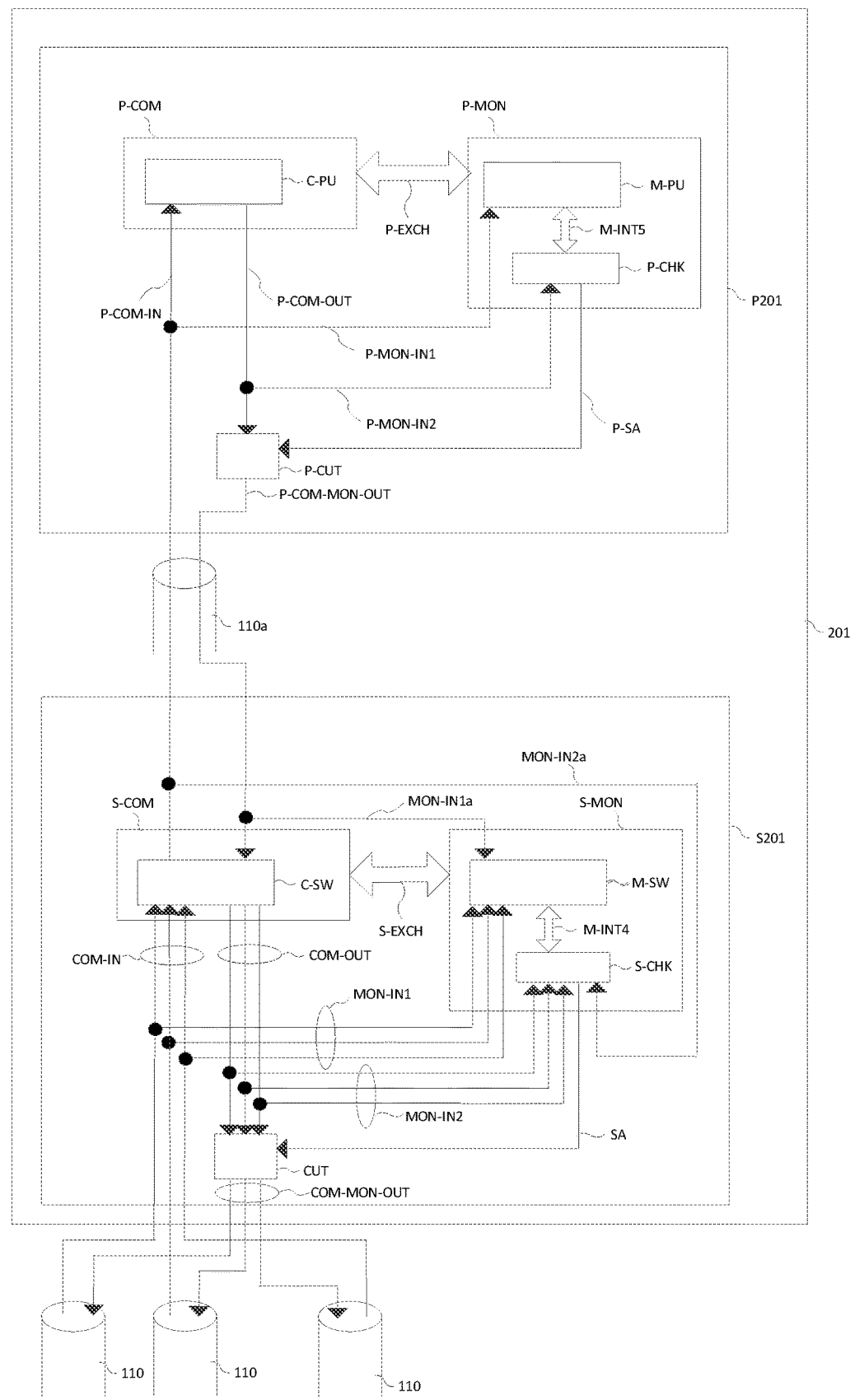

FIG. 5 depicts another example realization of the modularization of the commander part COM and the monitor part MON. In this example the network device 201 is realized by two encapsulated devices P201 and S201. In this example realization the modules P-COM and P-MON as well as the respective safety actions P-SA and P-CUT are encapsulated in an encapsulated device P201, while the remaining modules S-COM and S-MON as well as the safety actions SA and CUT are encapsulated in another encapsulated device. The two encapsulated devices P201 and S201 are connected to each other by means of an encapsulation link 110a. In an example realization this encapsulation link 110a may be a communication link 110. However, the encapsulation link 110a may also differ from the communication links 110 in the network, for example it may be realized by communication speeds, communication protocol, physical characteristics, etc. that differ from the ones used by the communication links 110.

Figure 6:
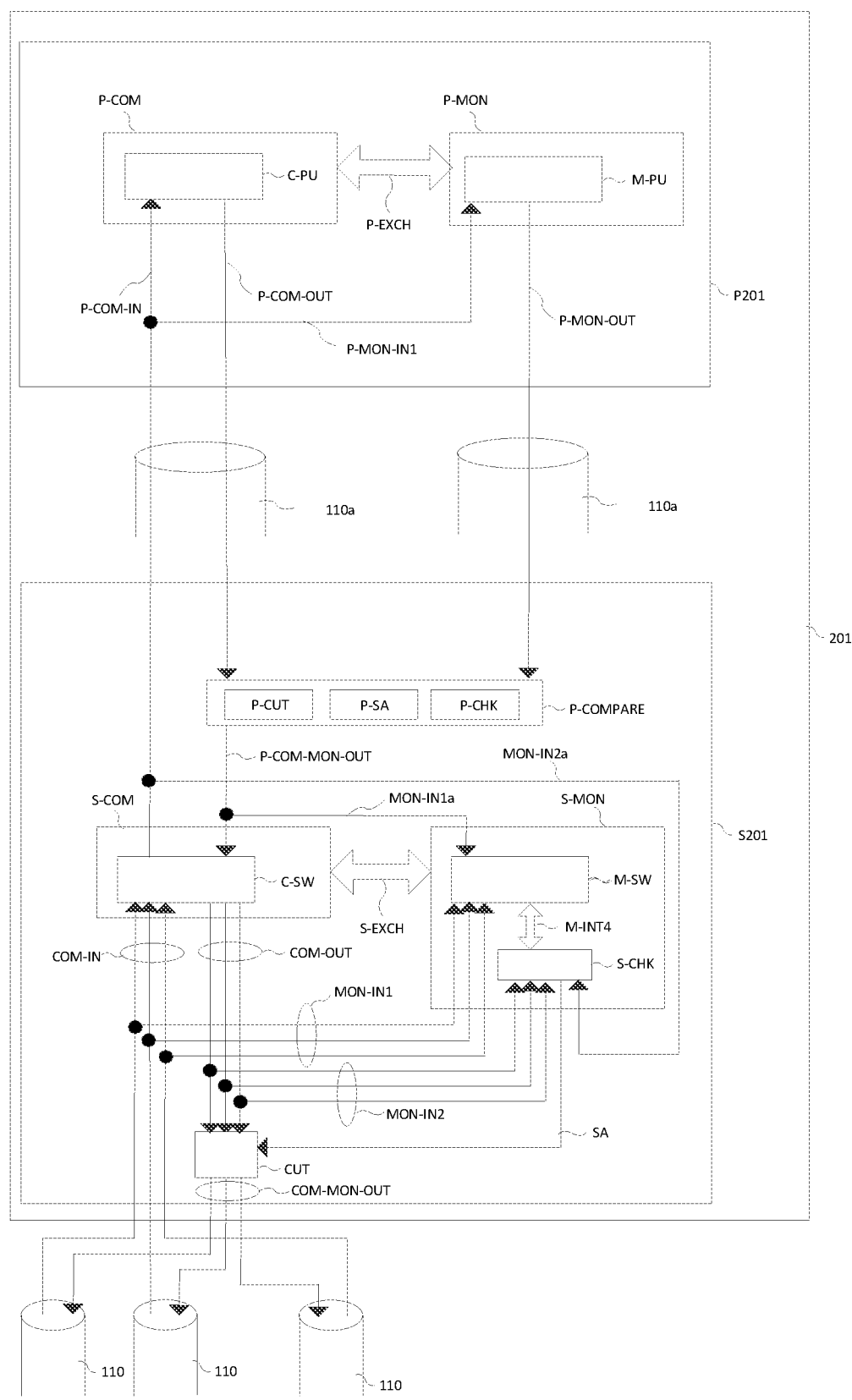

FIG. 6 depicts another realization of the modularization of the commander part COM and the monitor part MON. In this example the network device 201 is realized by two encapsulated devices P201 and S201. In this example the two encapsulated devices P201 and S201 are connected by two encapsulation links 110a. In this example realization the protocol data checks P-CHK, the protocol safety actions P-SA, and the interception mechanism P-CUT is implemented outside the P-MON module as part of the encapsulated device S201. In some realization the protocol data checks P-CHK, the protocol safety actions P-SA, and the interception mechanism P-CUT may be realized together by means of a compare action P-COMPARE that takes as input P-COM-OUT which is output of the P-COM module and takes as an input P-MON-OUT which is output of the P-MON module and generates the output P-COM-MON-OUT which is input to the S-COM module. The data communicated on P-COM-MON-OUT may be equal to the data communicated on P-COM-OUT if the protocol checks P-CHK indicate that data communicated on P-COM-OUT is correct.

Figure 7:
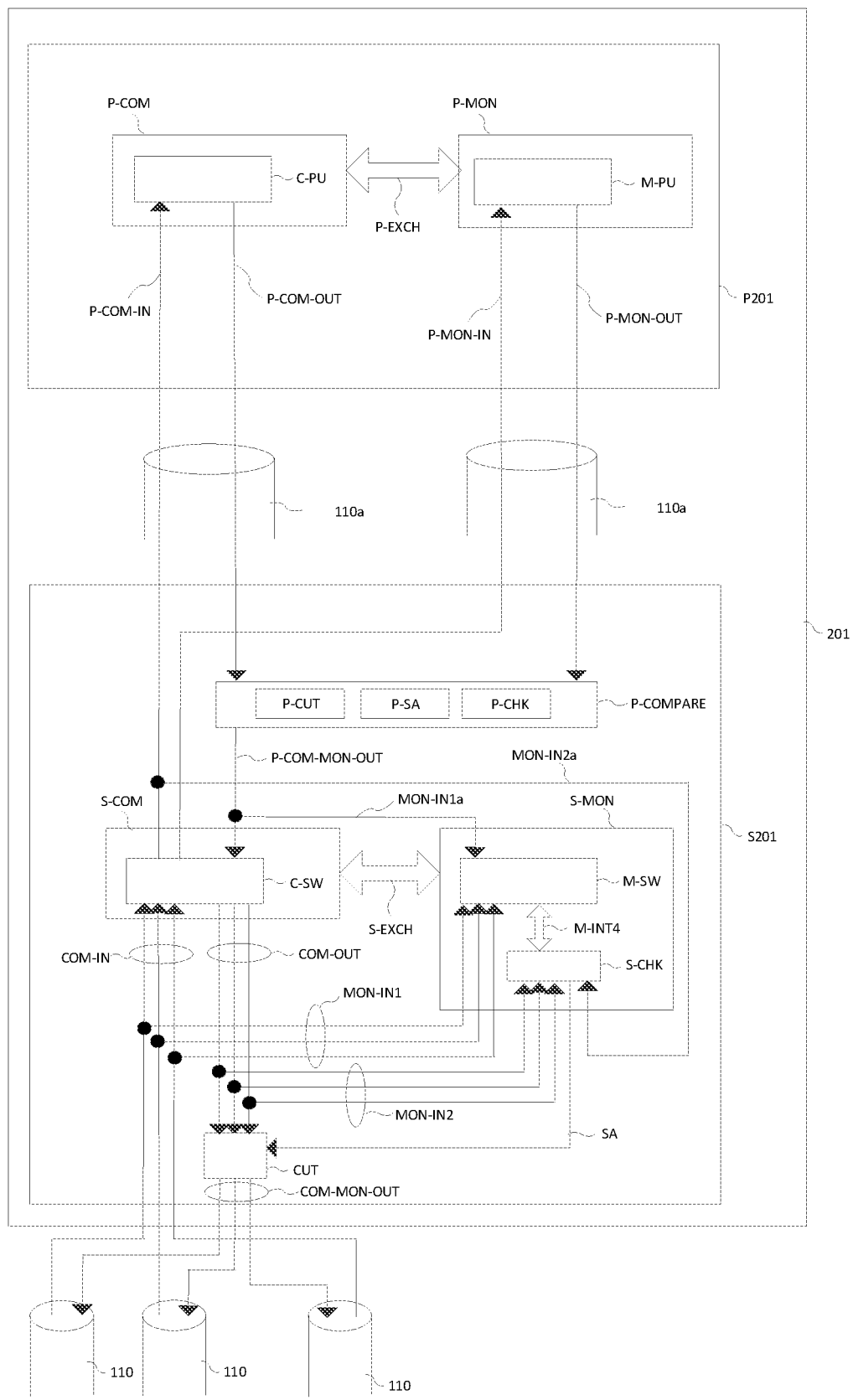

FIG. 7 depicts another realization of the modularization of the commander part COM and the monitor part MON. In this example the network device 201 is realized by two encapsulated devices P201 and S201. In contrast to previous examples the P-MON module in the encapsulated device P201 does not take as input a branched signal from the P-COM-IN, but receives its input directly from the S-COM module via P-MON-IN. Both P-MON-IN and P-MON-OUT are communicated by means of an encapsulation link 110a.

That which is claimed is:

1. A self-checking network device (201) for communication in a real-time computer network, wherein the self-checking network device (201) is connected to two or more communication links (110), and the self-checking network device (201) exchanges regular data and protocol data with other network devices (201, 202, 203) and/or nodes (101) of the real-time computer network using the two or more communication links (110), and said protocol data is communicated as part of one or more certain network protocols, the self-checking network device (201) comprising:
    at least four modules (S-COM, P-COM, P-MON, S-MON);
    wherein a first module (S-COM) of the at least four modules is configured to receive both the regular data and the protocol data from said two or more communication links (110) on a first input (COM-IN),
    wherein said first module (S-COM) is configured to forward the protocol data on a second input (P-COM-IN) to a second module (P-COM) of the at least four modules,
    wherein said second module (P-COM) is configured to execute a first function (C-PU) as part of the one or the more certain network protocols using the protocol data received on said second input (P-COM-IN) and produce the protocol data as output on a first output (P-COM-OUT),
    wherein a third module (P-MON) of the at least four modules is configured to exchange information with the second module and monitor said second input (P-COM-IN) and said first output (P-COM-OUT) of said second module (P-COM),
    wherein said third module (P-MON) is configured to execute protocol checks (P-CHK) on said second input (P-COM-IN) and said first output (P-COM-OUT) and execute a safe action (P-SA) if said protocol checks (P-CHK) indicate that said second module (P-MON) does not confirm to rules of said one or more certain network protocols,
    wherein when said third module (P-MON) does not execute a safe action (P-SA), the protocol data produced by said second module (P-COM) on said first output (P-COM-OUT) is provided on a third input (P-COM-MON-OUT) to said first module (S-COM), and
    wherein said first module (S-COM) is configured to execute regular operations (C-SW) on regular data and on the protocol data received from said third input (P-COM-MON-OUT),
    wherein a fourth module (S-MON) of the at least four modules is configured to exchange information with the first module and monitor the first input (COM-IN), the second input (P-COM-IN), the third input (P-COM-MON-OUT) and the second output (COM-OUT) of said first module (S-COM),
    wherein said fourth module (S-MON) is configured to execute regular data checks (S-CHK) on said first input (COM-IN), on said second input (P-COM-IN), on said third input (P-COM-MON-OUT), and on said second output (COM-OUT) and execute a safe action (SA) if said regular data checks (S-CHK) indicate a failure of the said first module (S-COM), and
    wherein when said fourth module (S-MON) does not execute a safe action (SA), the self-checking network device (201) is configured to provide the protocol data and/or regular data received on said second output (COM-OUT) to the two or more communication links (110).

2. The self-checking network device (201) according to claim 1, wherein a number of second inputs (P-COM-IN) is smaller than a number of first inputs (COM-IN), and/or a number of first outputs (P-COM-OUT) is smaller than a number of second outputs (COM-OUT).

3. The self-checking network device (201) according to claim 1, wherein said fourth module (S-MON) is configured to coordinate (S-EXCH) its monitoring activity with said first module (S-COM).

4. The self-checking network device (201) according to claim 1, wherein said third module (P-MON) is configured to coordinate (P-EXCH) its monitoring activity with said second module (P-COM).

5. The self-checking network device (201) according to claim 1, wherein said self-checking network device is formed by at least two encapsulated devices (P201, S201), wherein said at least two encapsulated devices (P201, S201) are connected to each other by one, two, or more encapsulation links (110a), wherein a first encapsulation device (P201) is configured to implement said second module (P-COM) and said third module (P-MON), and wherein a second encapsulation device (S201) is configured to implement said first module (S-COM) and said fourth module (S-MON).

6. The self-checking network device (201) according to claim 1, wherein said first function (C-PU) is a compression master function, a synchronization master function, and/or a synchronization client function as standardized in SAE AS6802 or any following standard.

7. The self-checking network device (201) according to claim 1, wherein said first function (C-PU) is a grandmaster functionality according to one of the standards: IEEE 802.1AS, IEEE 1588, or any following standards to these standards.

8. The self-checking network device (201) according to claim 1, wherein said first function (C-PU) is a network address learning function or a network address providing function.

9. A real-time computer network comprising:
at least one self-checking network device (201); and
one, two, or a multitude of nodes (101) connected to said self-checking network device (201),
wherein the one, two or more of said self-checking network devices is/are network devices (201) according to claim 1.

* * * * *